Jan. 14, 1969                    A. B. WELSH ET AL                    3,422,209
                   ELECTRONIC ORGAN HAVING PERFORATED ROLL
                           CONTROLLED PLAYING MECHANISM
Filed June 7, 1965

INVENTORS
ALAN B. WELSH
BY ROGER T. WEST

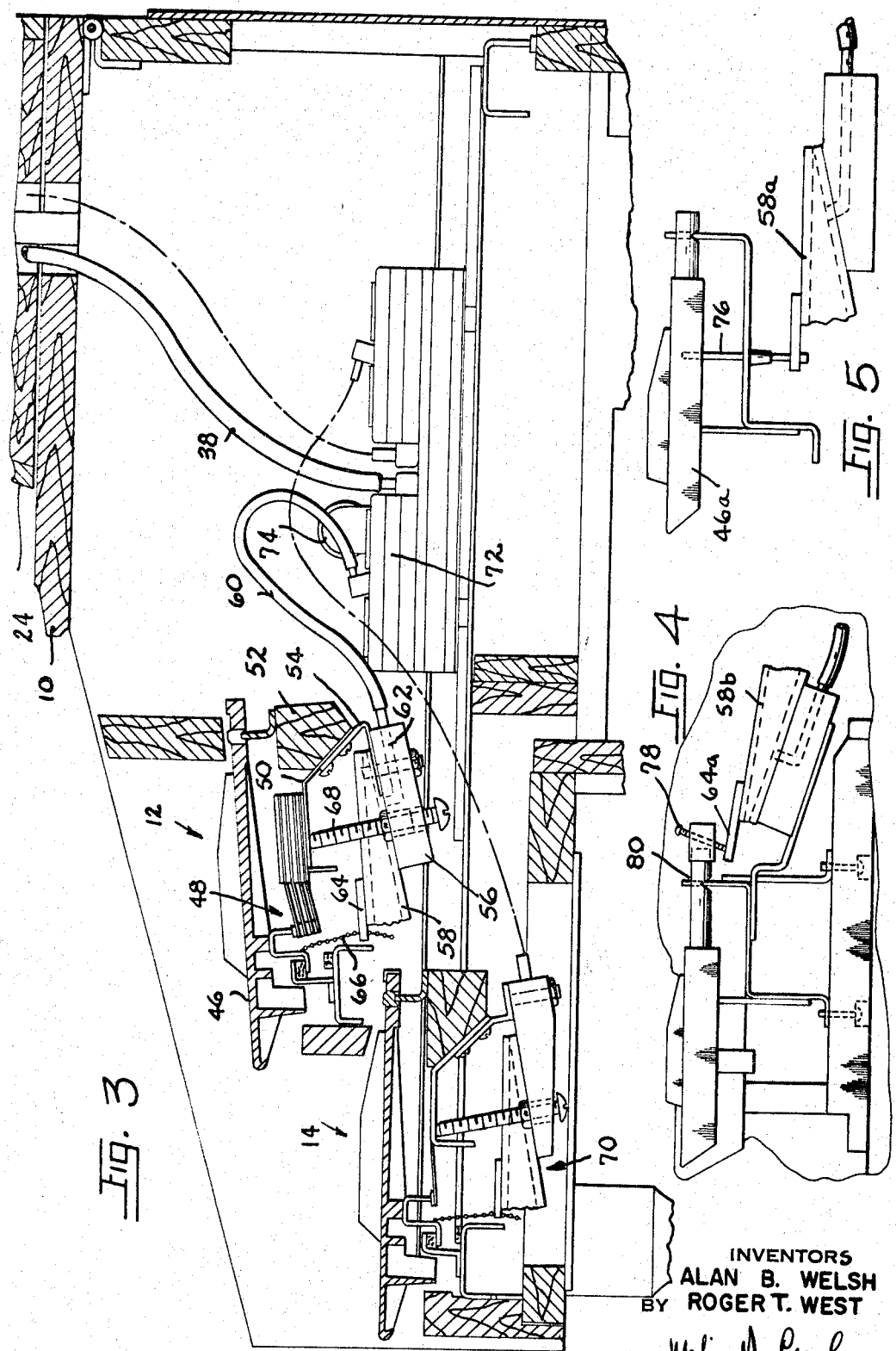

Jan. 14, 1969   A. B. WELSH ET AL   3,422,209
ELECTRONIC ORGAN HAVING PERFORATED ROLL
CONTROLLED PLAYING MECHANISM
Filed June 7, 1965   Sheet 3 of 8
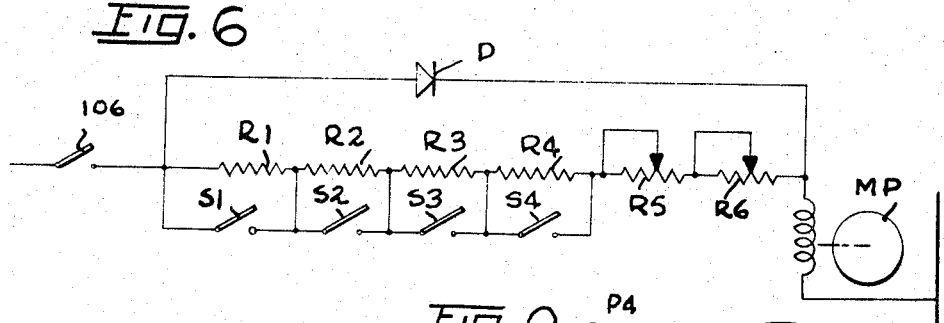
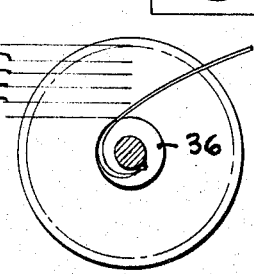
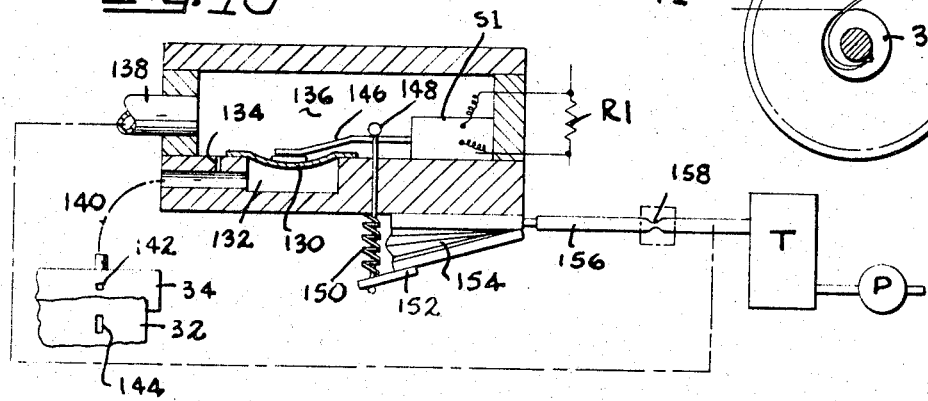
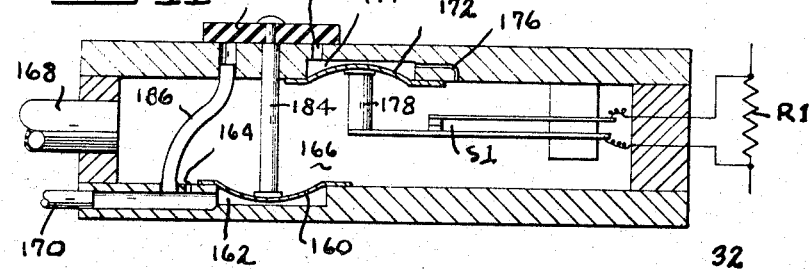
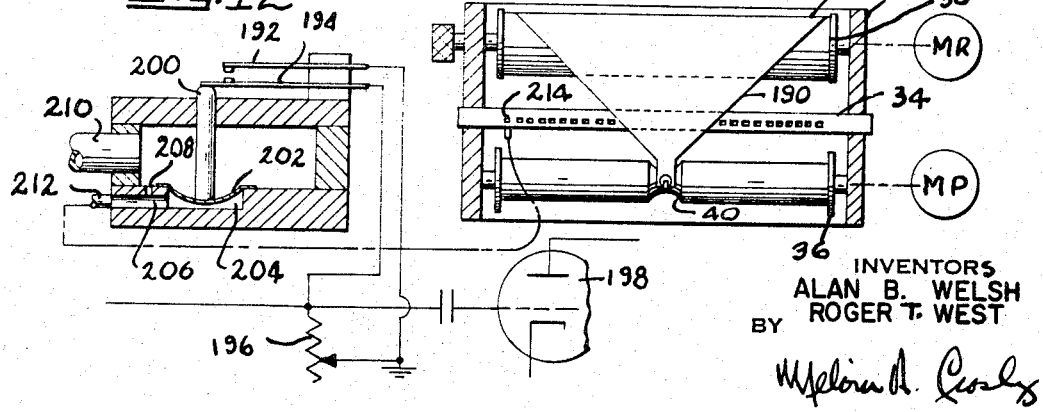
INVENTORS
ALAN B. WELSH
ROGER T. WEST
BY

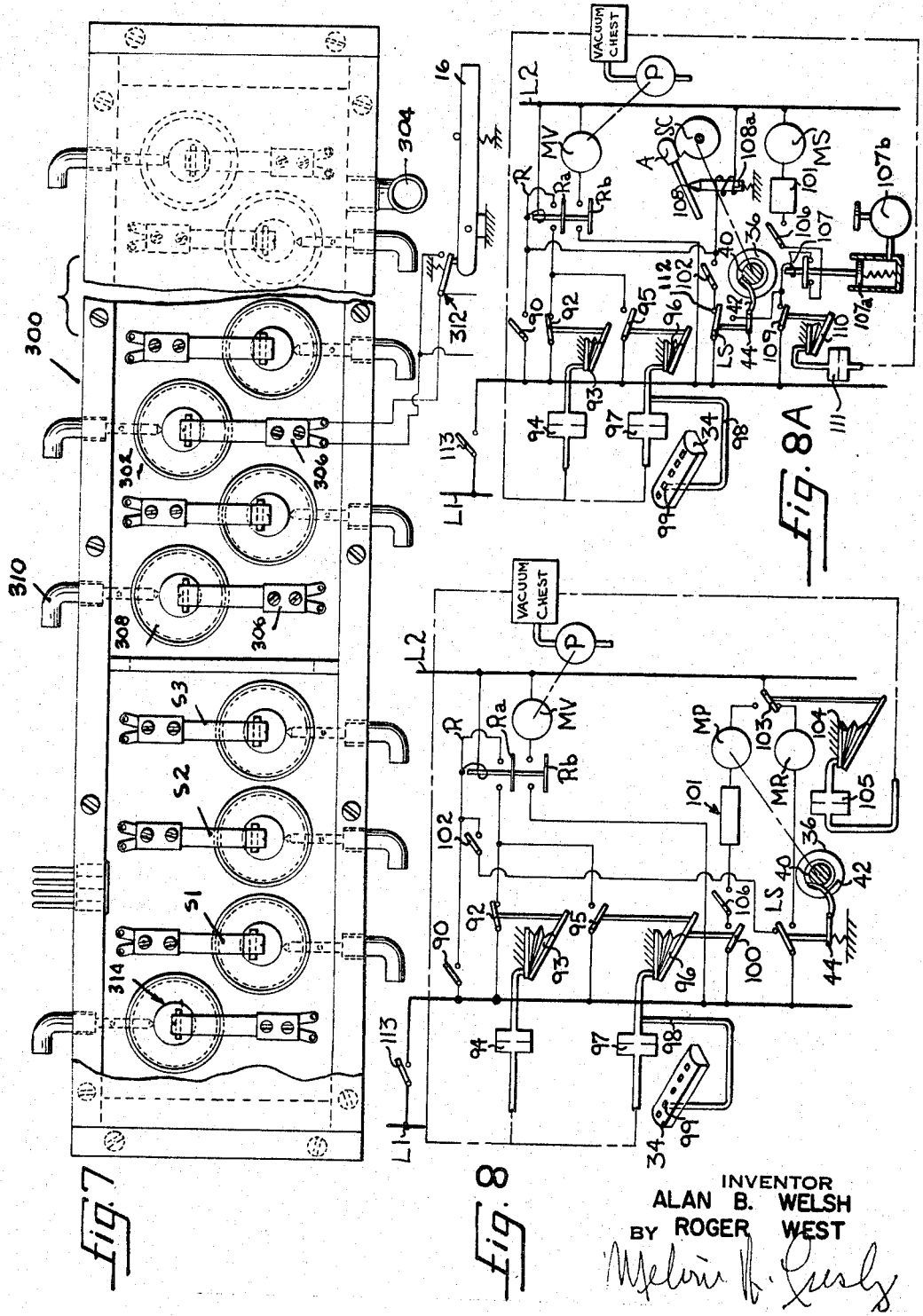

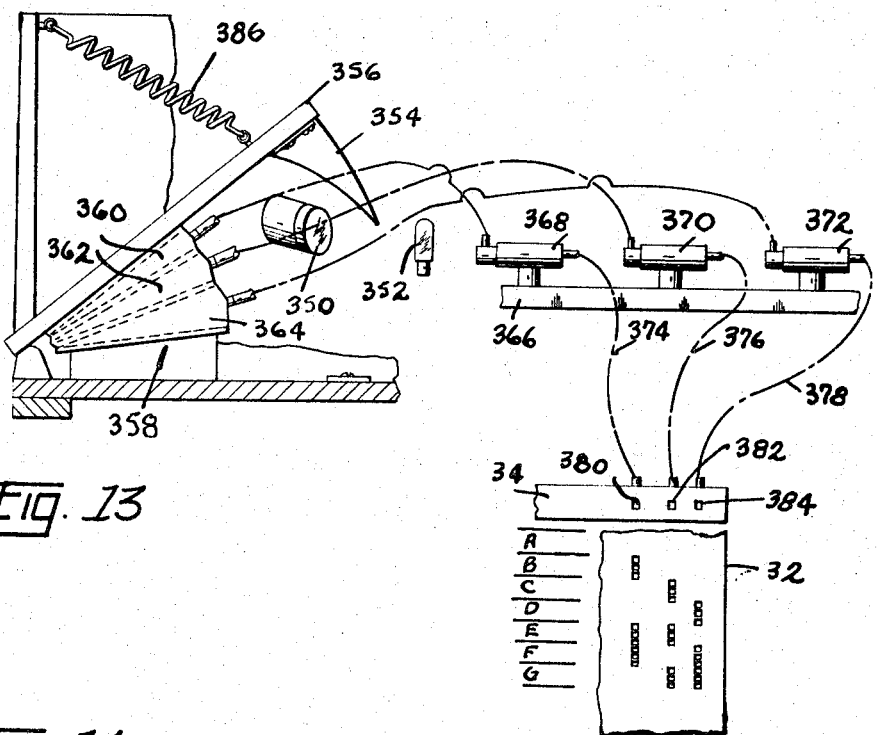
Fig. 13
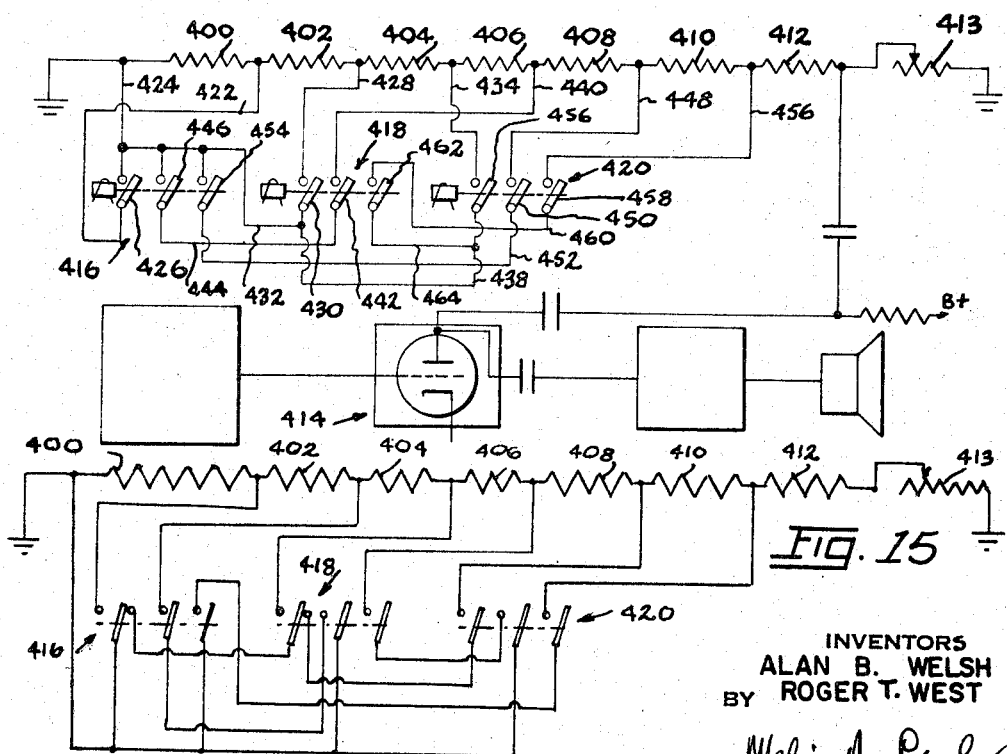
Fig. 14
Fig. 15
INVENTORS
ALAN B. WELSH
BY ROGER T. WEST

INVENTORS
ALAN B. WELSH
ROGER T. WEST

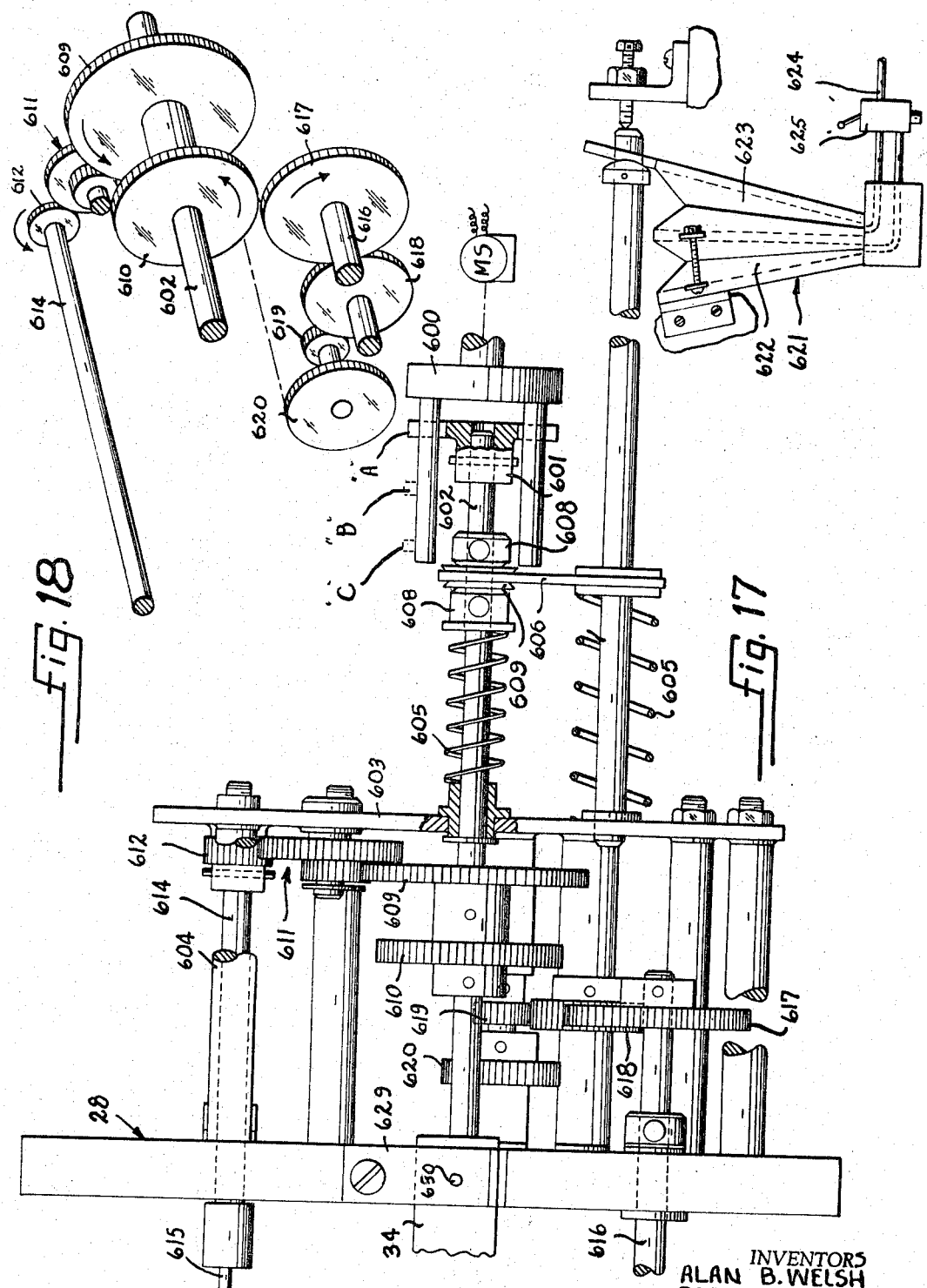

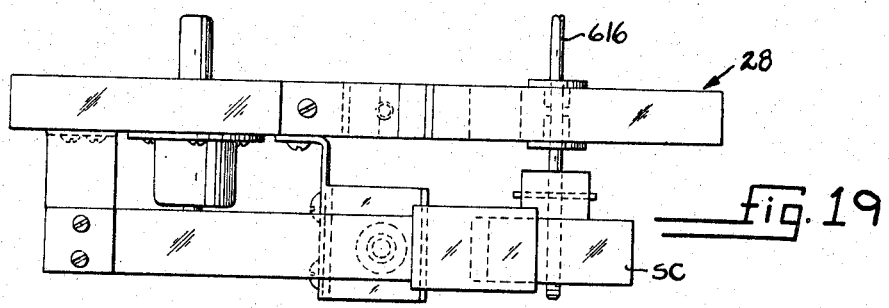
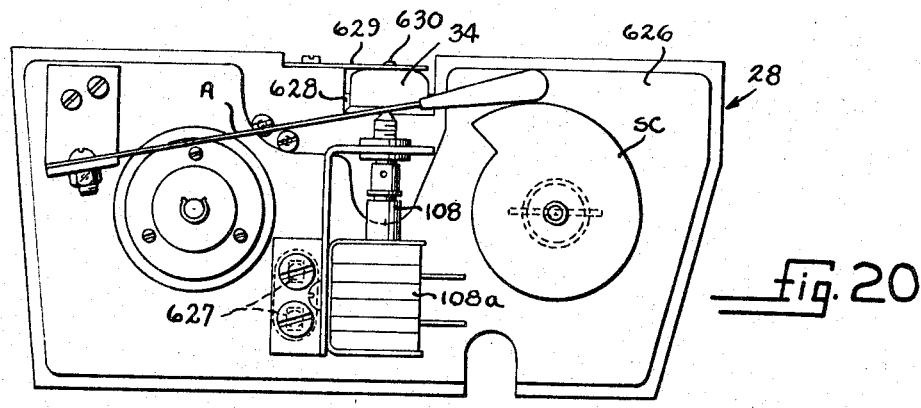
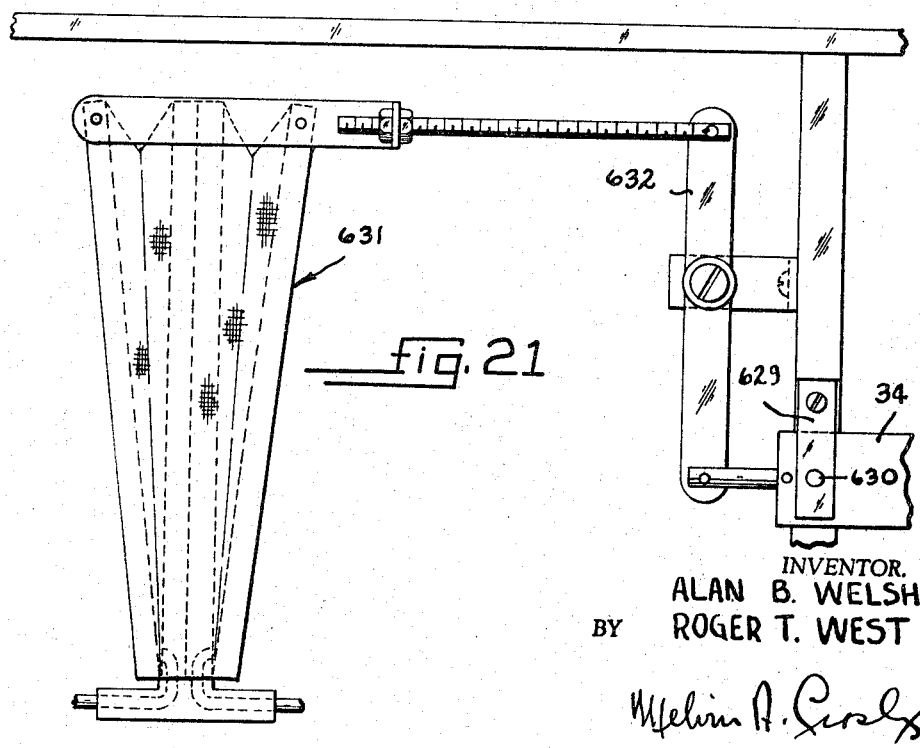

United States Patent Office 3,422,209
Patented Jan. 14, 1969

3,422,209
ELECTRONIC ORGAN HAVING PERFORATED ROLL CONTROLLED PLAYING MECHANISM
Alan B. Welsh and Roger T. West, Jasper, Ind., assignors to Jasper Electronic Mfg. Corp., Jasper, Ind., a corporation of Indiana
Filed June 7, 1965, Ser. No. 461,940
U.S. Cl. 84—1.03            22 Claims
Int. Cl. G01f 1/00

ABSTRACT OF THE DISCLOSURE

Player type electronic organ having a perforated player roll controlled playing mechanism recessed into the top of the organ case. The playing of the pedal notes of the organ, the organ volume, and the speed of movement of the player roll are all under the control of the player roll by perforations provided therein for that purpose.

---

This invention relates to musical instruments and is particularly concerned with a player type electric organ in which the organ is controlled by a perforated roll through a pneumatic system.

Player type musical instruments are, of course, well known, and include as a particular well known example, player pianos, which are controlled by perforated paper rolls that are drawn over a tracker bar which, in turn, effects control of key operating pneumatic motors by availing of valves that are, in turn, controlled by the tracker bar.

The present invention is primarily concerned with an adaptation of the perforated paper roll control system to an electric organ.

A particular object of the present invention, therefore, is the provision of a player type electric organ.

Another object of this invention is the provision of a player type electric organ in which a perforated paper roll effects control of the organ and wherein special control elements peculiar to organs are included in the control system.

Another object of the present invention is the provision of an arrangement for preventing the organ from developing any sounds due to the depressing of the keys thereof until the full length of the tracker bar is covered by the paper roll.

Another object of this invention is the provision of an arrangement for gradually reducing the speed of the take up roll as the paper roll is taken up thereon during playing.

A particular object of the present invention is the provision of a novel arrangement for controlling the organ volume during playing by means of signals placed on the perforated roll in the form of perforations.

A still further object of this invention is the provision of a player type organ which is substantially conventional with regard to the basic organ structure and which can be played in the conventional manner.

Still another object is the provision of an improved roll driving arrangement.

These and other objects and advantages will become apparent upon reference to the following specification taken in connection with the accompanying drawings wherein:

FIGURE 3 is a sectional view which is indicated by line III—III in FIGURE 1 showing one form which the keyboard structure of the organ and the key actuating mechanism can take;

FIGURE 4 is a fragmentary view showing a modified structure for actuating the keys;

FIGURE 5 is a view like FIGURE 4 but showing still another way in which the keys can be actuated;

FIGURE 6 is a view showing a portion of the control circuit of FIGURE 8 and specifically for the purpose of controlling the speed of the motor which drives the perforated paper roll during playing;

FIGURE 7 is a view showing a group of vacuum operated switches to be employed in connection with the organ;

FIGURE 8 is a schematic view of one type of control circuit for use with player organs according to the present invention;

FIGURE 8A is a view of a modified control circuit;

FIGURE 9 is a schematic view showing the points during the reeling up of the paper roll at which the circuit of FIGURE 6 is effective for adjusting the speed of the playing motor;

FIGURE 10 is a schematic view of one type of switch that can be employed in connection with the FIGURE 6 circuit;

FIGURE 11 is a sectional view through another type switch that can be employed in connection with the FIGURE 6 circuit;

FIGURE 12 is a diagrammatic view showing how the organ is prevented from developing any sound until the full length of the tracker bar is covered by the player roll;

FIGURE 13 is a somewhat schematic view showing the manner in which the organ volume can be controlled by utilizing perforations in the player roll;

FIGURE 14 shows another circuit arrangement for controlling the organ volume by perforations in the player roll;

FIGURE 15 is a circuit similar to that of FIGURE 14;

FIGURES 17 and 18 are plan and perspective views of a two speed drive for the rolls;

FIGURES 19 and 20 are plan and side views of a control arrangement for the rolls;

FIGURE 21 is a view showing the adjustment mechanism for the trader bar; and

Figure 1:
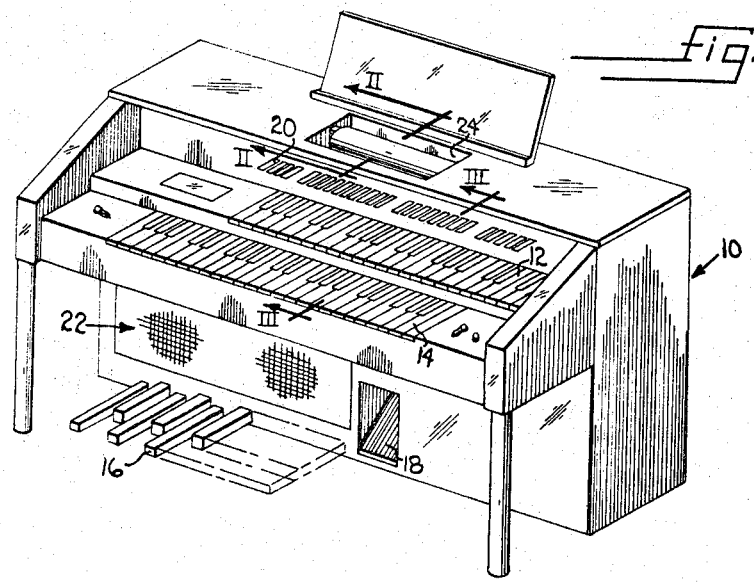
FIGURE 1 is a perspective view of a player organ according to the present invention.

Referring to the drawings somewhat more in detail, in FIGURE 1, 10 represents an organ of the electric or electronic type having an upper key board 12, a lower key board 14, a pedal key board 16, a swell or volume control member 18, adjustable tabs 20 for selecting the voicing of the organ, and speaker means generally designated at 22.

According to the present invention, the organ is provided with a compartment 24 which may advantageously be mounted in top of the organ case, as shown, and which includes lid means 26 so that access can be had to the interior of the compartment for inserting and removing rolls.

Figure 2:
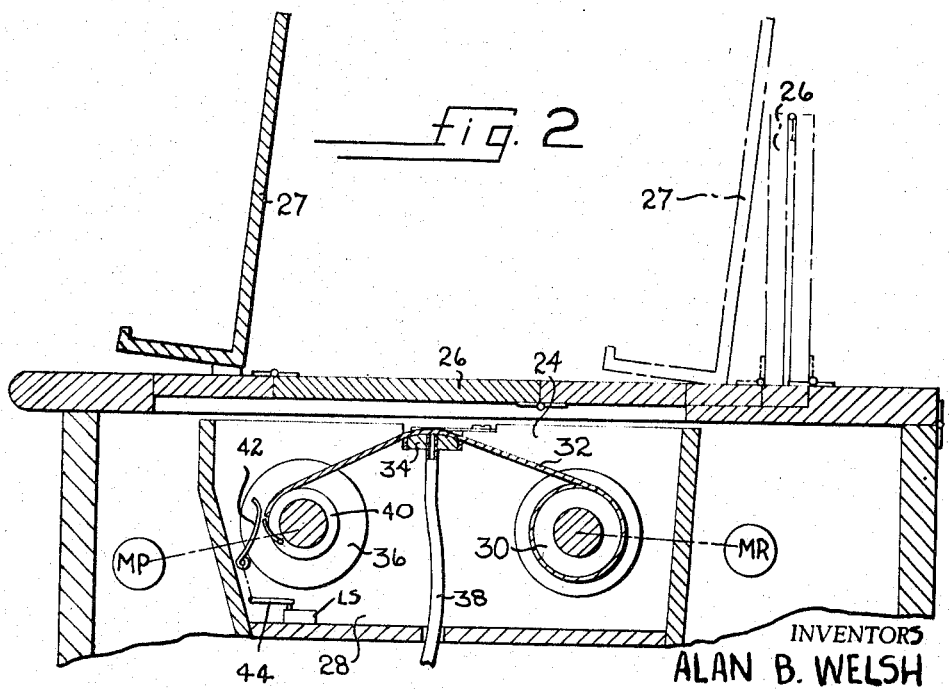
FIGURE 2 is a sectional view indicated by line II—II in FIGURE 1 showing the compartment containing the player roll and the take up roll.

The lid means 26 may, to advantage, be connected to the music panel 27 so that the compartment may be opened by pushing the music panel backwardly as the lid means is buckled upwardly as shown in dot-dash outline in FIGURE 2, other lid arrangements could be employed while the playing mechanism remains in the compartment recessed in the top of the organ.

Within the compartment, a frame 28 has means for supporting a substantially conventional perforated paper-player roll 30. The web of paper designated 32 is adapted for being led over an elongated perforated tracker bar 34 and connected at its tapered leading end to a take up reel or roll 36. A playing motor MP is connected to take up roll 36 and a rewind motor MR is connected to roll 30. Another drive arrangement, illustrated in FIGURES 17 and 18 will be described hereinafter.

As is conventional with player pianos, the tracker bar is perforated and the perforations are under the control of holes in paper web 32.

Each perforation of the tracker bar is connected to a tube 38 which leads to valves which are sensitive to the pressure condition existing in the respective tube.

Insofar as the tracker bar, the player roll support and drive, and the take up roll support and drive, are concerned, the present invention corresponds to a conventional player piano.

FIGURE 2 will also show that take up roll 36 is centrally grooved at 40 and into which groove a pivoted lever 42 will drop which will actuate a lever 44 connected thereto to trip a limit switch LS. This will occur when the paper roll is substantially entirely rewound on roll 30 and is operable to shut off the entire mechanism. This also is the same as is employed in connection with player pianos.

Another control mechanism for the roll is shown in FIGURES 19 and 20, and will be described hereinafter.

FIGURE 3 will show that upper key board 12 consists of keys 46 which control switches 48 that control the tones which will issue from the organ speaker, according to well known practices.

The switches 48 are carried on a frame 50 mounted on a stationary transverse rail 52. This rail 52 is also availed of for supporting bracket means 54 and each bracket means 54 carries a block 56, or alternating block 56 can extend the entire length of key board 12. Mounted on block 56 is a pneumatic motor 58 of a conventional type for each key to be operated automatically. The motor is normally relaxed, as shown, and is adapted for being collapsed by the application of suction to the interior thereof via tube 60 and passage means 62 in block 56 which leads into the motor.

An individual pneumatic system is employed for each key to be operated automatically and the pneumatic can be relatively small because only a few ounces, say, from three to five ounces, is necessary to actuate the playing key.

The top movable wall of the pneumatic motor 58 has a projection 64 thereon and connected between projection 64 and the lower side of key 46 is a bead chain 66 or a similar flexible element. This element can be elastic and eliminate critical adjustment of the motor relative to the actuated key.

It will be apparent that key 46 can be manually actuated at any time so that the organ can be played in a conventional manner, or motor 58 can be actuated to depress the key during automatic playing. Adjustment of the switch means 48 can be accomplished by adjustment screw 68 adjustably mounted in block 56.

A similar key operating arrangement generally designated 70 is associated with the keys of the lower switch board 14.

Tube 60 leads to a valve 72 and which valve, in turn, has connected thereto the aforementioned tube 38 leading from tracker bar 34. Also leading to valve 72 is a suction line 74 which is connected to a suitable source of suction.

There is, of course, one of the valves 72 for each pneumatic motor 58 and the suction line is connected to all of the valves. According to practices well known player pianos and the like, valve 72 is normally positioned to connect its pertaining pneumatic motor to the atmosphere so that the said motor is relaxed or expanded. This is the condition which will exist when the tube leading from the valve to the tracker bar is closed off at the tracker bar end and is, thus, under suction. When a perforation in the paper web passing over the tracker bar uncovers the end of the tube, however, and the tube is subjected to atmospheric pressure, the valve 72 pertaining thereto will shift and suction will be applied via tube 60 and passage 62 to the pertaining motor 58, and the motor will be actuated and the corresponding playing key will be depressed.

As will be seen in FIGURE 5, the motor 58a which corresponds to motor 58 of FIGURE 3 can be attached to its pertaining playing key 46a by rod means 76 having a one-way drive connection with the said motor, whereby actuation of the motor will pull the key down while the key can be depressed at any time independently of the motor.

In FIGURE 4 the key actuating motor is shown at 58b and this arrangement differs from those previously described in that the plate 64a which is operated by the motor to actuate the key is positioned over the pivot of the motor so that when the motor is actuated the outer end of plate 64a will move upwardly. Upward movement of outer plate 64a causes it to actuate an adjustable screw 78 in the end of the key which overhangs the pivot 80 of the key. As before, the key can be operated independently of the motor at any time so that the organ can be played in the normal manner.

FIGURE 8 shows diagrammatically a control circuit that can be employed for controlling the playing mechanism of the organ. In FIGURE 8 lines L1 and L2 represent the source of power. A relay R is connected between these lines in series with a switch 90 which can be depressed to energize the relay. When the relay is energized the blade Ra thereof establishes a holding circuit for the relay coil which holding circuit is completed through a first normally closed switch 92. This switch is operated to open position by pneumatic 93 when suction is built up therein. Suction is built up in pneumatic 93 when suction develops in the vacuum chest and is conducted to the pneumatic by way of restrictor 94. Restrictor 94 delays the build-up of vacuum in pneumatic 93 so that switch 92 will remain closed for a period of time after switch 90 is depressed.

A second switch 95 is in parallel with switch 92 and this switch is closed when suction is developed in the pneumatic 96 pertaining thereto which is also connected with the vacuum chest via restrictor 97. Switch 95 is arranged to close before switch 92 opens.

A tube 98 leads from the pneumatic side of restrictor 97 to a hole 99 in tracker bar 34. Hole 99 is covered throughout the time a roll is being played and is only uncovered at the terminal end of the roll by an aperture in the paper roll. When the paper roll reaches its terminal end switch 92 is, of course, open and when hole 99 is uncovered and the suction in pneumatic 96 drops, switch 95 will also open and relay R will drop out.

Relay R has a second blade Rb thereon that completes the energizing circuit to the motor MV that drives the suction pump P which develops suction in the vacuum chest.

Pneumatic 96 also operates a switch 100 into closed position which is in circuit with the playing motor MP and which motor also has pertaining thereto a circuit of FIG. 6, generally designated as 101.

The rewind motor MR is in circuit with switch LS which is under the control of arm 44 that is attached to feeler 42 associated with wind-up roll 36. When feeler 42 drops into groove or notch 40 of wind-up roll 36, indicating that a paper roll is substantially completely wound up on its spool, feeler 42 drops into groove 40 and actuates switch LS thereby halting the rewind motor.

If a selector switch 102 is closed, the actuation of switch LS will cause relay R to be energized, thereby again energizing play motor MP and the same roll will again be played. If switch 102 is open relay R will not be energized and the playing operation will come to a halt.

A switch 103 is provided to determine which of motors MP and MR will have a circuit completed thereto. Switch 103 is controlled by a pneumatic 104 connected to the vacuum chest by way of restrictor 105.

When the play mechanism is started, switch 103 will remain in circuit with motor MR until vacuum builds up in the vacuum chest. Motor MR will not at that time run because switch LS will be held open. When the vacuum develops and operates pneumatic 104 switch 103 will complete the circuit to motor MP and the playing operation will commence. When the paper web of the playing roll commences to wind up on roll 36 feeler 42 will be operated and switch LS will close but the circuit to motor MR will not be completed because of the shifted position of switch 103. The circuit to motor MR will be completed only when the playing cycle has been finished and relay R has been dropped out and the vacuum decays in the vacuum chest thereby permitting pneumatic 104 to relax.

The circuit of FIG. 8 is arranged to control the playing mechanism when two motors are included, viz. the motor MP for driving the playing roll during playing, and a motor MR for driving the playing roll during rewind.

As will be seen hereinafter, with particular reference to FIGS. 17 and 18, it is possible to employ a single motor for operating the playing mechanism and a circuit for controlling this single motor is disclosed in FIG. 8a. A considerable portion of the circuit of FIG. 8a is the same as the circuit of FIG. 8 and therefore carries the same reference numerals. There is in FIG. 8a, however, only one motor MS which is to be controlled during playing and rewinding. The change in direction of the paper web from a playing operation to a rewinding operation is accomplished by a gear shifting mechanism disclosed in FIGS. 17 and 18 which is entirely pneumatically operated.

In FIG. 8a the motor MS is in circuit with a normally closed relay 107 which will open to interrupt the circuit to motor MS when the motor stalls and the current therethrough increases. Relay 107 has a dashpot 107a, or other delay means associated therewith to delay the closing thereof following its opening. In FIG. 8a, roll 36 has a spiral cam SC connected thereto cooperating with arm A which is normally held out of engagement with the cam by armature 108 which is controlled by solenoid 108a.

In the circuit for motor MS is the control arrangement of FIG. 6, indicated at 101, and the start-stop switch 106 which permits stopping of the playing motor at any time. The circuit for motor MS also leads through a switch 109 as adapted for being closed by a pneumatic 110 when suction builds up in the vacuum chest and is conveyed thereto via a restrictor 111.

The switch LS which is under the control of arm 44 connected to feeler 42 associated with roll 36 is adapted, when the paper web lifts feeler 42 to close on a contact 112 which is connected to the wire leading from switch 109 to the coil or relay 107. This contact is also connected with the side of repeat switch 102 which leads to solenoid 108a.

Each of the circuits of FIGS. 8, 8a also advantageously include main switches 113 which can be opened to de-energize the entire circuit and which are closed preparatory to starting the playing mechanism.

In operation, the circuit of FIG. 8a is energized by depressing switch 90 which will, as in the case of the circuit of FIG. 8, cause energization of relay R thereby to close blades RA and RB. Blade RA establishes a holding circuit for the relay while blade RB energizes motor MV so as to operate vacuum pump P and to develop suction in the vacuum chest.

After suction has built up in the vacuum chest, pneumatic 110 will close switch 109 and motor MS will be energized. Prior to this time feeler 42 resting in groove 40 holds switch LS in its upper position and the motor MS can therefore not be energized through this branch.

After the paper webs starts to be taken up on roll 36 feeler 42 will be lifted and the blade of switch LS will close on contact 112 and thus will establish the energizing circuit for motor MS throughout the playing operation and the following rewinding operation up until feeler 42 again drops into groove 40.

After the player roll has been completely played, the hole 99 in tracker bar 34 is again uncovered thereby permitting pneumatic 96 to relax and switch 95 to open, which will de-energize relay R and permit the motor MV to stop whereupon the vacuum will decay in the vacuum chest.

When the vacuum decays in the vacuum chest, the drive from motor MS to the rolls of the playing mechanism is reversed by a gear shifting operation to be described herein after and the paper web starts to be wound up on its original roll and drawn off from roll 36.

If repeat switch 102 is open, the winding up of the paper web will continue until it is all wound up on the original roll and when feeler 42 drops in groove 40, the circuit to motor MS will be interrupted and the motor will coast to a halt. The motor will, of course, coast far enough to permit the end of the paper web to become detached from roll 36.

If, on the other hand, repeat switch 102 is closed, when feeler 42 drops into groove 40 and the blade of switch LS moves upwardly, an energizing circuit will be established to motor MS and it will continue to run under power. Also an energizing circuit will be established for solenoid 108a which will draw armature 108 downwardly and drop the end of arm A into the path of the notch on cam SC which is connected to roll 36. Cam SC will drop roll 36 before the end of the player roll becomes detached therefrom and at this time motor MS will run and draw the paper up snug whereupon the motor will stall and the increased current through the coil of relay 107 will cause it to open and deenergize motor MS. As explained, relay 107 will reclose only after a predetermined lapse of time.

The upward movement of the blade of switch LS also completes an energizing circuit to relay R which becomes energized and therefore restarts the vacuum pump motor MV. By adjusting the control valve 107b pertaining to dashpot 107a, the reclosing of relay 107 can be delayed until the proper degree of vacuum has built up in the vacuum chest. Alternately, relay 107 could latch open and be arranged to be unlatched in response to the development of a predetermined amount of suction in the vacuum chest.

The circuit for controlling the speed of the playing motor MP is shown more in detail in FIGURE 6. In this figure, it will be seen that motor MP is supplied by a series of resistors, R1, R2, R3, R4, R5, and R6, the last two being manually adjustable. Diode D bypasses the resistors. The control of the speed of motor MP is effected by cutting resistors R1 to R4 into and out of the circuit and by adjusting resistors R5 and R6. The lower the resistance the greater the motor speed, and the higher the resistance the lower the motor speed.

Each of the resistors R1 through R4 is bypassed by a switch blade S1 to S4, respectively, which are controlled according to a particular feature of the present invention. The nature of this feature will be evident upon reference to FIGURES 9 through 11.

Referring first to FIGURE 9, what is shown therein is the take up roll 36 and it will be evident that as the paper is wound up on this roll, the diameter of the roll will increase and if the roll 36 operates at a constant speed, the paper web will move faster and faster. It has been discovered that the speed of the roll can gradually be cut down, thereby to maintain uniform tempo and this can be done in steps if a sufficient number of steps are employed, say, a speed change for every 30 feet of the player roll, and the speed change will be imperceptible. These switches, for example, are operated sequentially when the paper roll has built up on take up roll 36 to the points P1, P2, P3 and P4.

FIGURE 10 shows one way of accomplishing this desirable result. In FIGURE 10, resistor R1 is bypassed by switch S1 which is normally closed. The switch is operated by a vacuum controlled switch arrangement which includes a pouch 130 which is normally held in the position shown in FIGURE 10 by suction in chamber 132 which bleeds into the chamber by a restricted port 134 opening into main vacuum chamber 136 which is connected by conduit 138 with vacuum tank T.

A tube 140 leads to an aperture 142 on tracker bar 34 and at a predetermined point along the paper web, an aperture 144 in the paper web uncovers tracker bar hole 142 and this will admit air into chamber 132, whereupon pouch 130 will flex upwardly and move blade 146 of switch S1 in a direction to open the switch, whereupon resistor R1 becomes effective for reducing the speed of motor MP. The others of switches S2, S3 and S4 are similarly operated at uniformly spaced points along the length of the player roll.

The aforementioned switches are snap action switches and will stay in the position into which they are actuated. Each switch, thus, when opened will stay open until again closed and when closed will stay closed until again tripped open. Resetting of the switches into closed position is accomplished by a resetting bar 148 engaging the blades 146 either individually or as a group. Bar 148 is spring urged by spring 150 in resetting direction and is also connected with the movable part 152 of pneumatic motor 154, which is connected via conduit 156 and restrictor 158 with tank T.

What occurs is that when the playing is stopped and vacuum pump P is, therefore, stopped and the vacuum decays in tank T, motor 154 will be released and spring 150 will pull bar 148 downwardly and reset the switches to their closed position. Thereafter, when playing is again started, the bar 148 will be held down and the switches will thus be closed for a predetermined length of time, sufficient for vacuum to build up in chambers 132 and pull pouches 130 downwardly. Thereafter motor 154 will be actuated to move bar 148 upwardly and release the switches but they will, at this time, remain closed because all of the pouches 130 are drawn downwardly.

FIGURE 11 shows a similar arrangement which does not require the resetting bar 148 and motor 154. In FIGURE 11 the bypass switch for resistor R1 is again indicated at S1 and is normally closed. A first pouch 160 is normally drawn downwardly by suction in chamber 162 bled into said chamber via port 164 which opens into main vacuum chamber 166 that is connected with the suction tank by conduit 168. A tube 170 leading to the tracker bar controls the admission of air into the chamber in the same manner as desrcibed in FIGURE 10.

In FIGURE 11 a second pouch 172 is provided normally drawn inwardly of chamber 174 by reason of a vacuum conducted to the chamber through bleed passage 176 opening into main vacuum chamber 166. Pouch 172 is adapted for operating switch S1 by way of plunger 178.

Chamber 174 is connected to the atmosphere by way of passage 180 that is normally closed by a valve member 182 adapted for actuation by pouch 160 through a pin 184. Chamber 162 is also connected to the atmosphere by way of a tube 186 also normally closed by valve member 182.

In operation, before vacuum builds up in tank T pouches 160 and 172 are relaxed and valve member 182 is, therefore, closed and switch S1 is also closed. When vacuum builds up in chamber 166, this condition will not change because vacuum will also build up in chambers 162 and 174. Upon admission of air into tube 170, at a predetermined point along the travel of the web of the player roll, however, pouch 160 will flex upwardly and thereby lift valve member 182 which will admit air to chamber 174 so that pouch 172 will flex downwardly and open switch S1.

Valve member 182 will stay in its open position even after the supply of air to tube 170 is cut off at the tracker bar because atmosphere admitted through tube 186 will prevent the build up of vacuum in chamber 162. There are, of course, as many of the switches of FIGURES 10 and 11 as there are resistors to be controlled in the circuit of motor MP.

As will be seen in FIGURE 12, the player roll 32 has a tapered leading end 190 which exposes a substantial length of tracker bar 34 for a certain period of time after movement of the player roll is initiated. To prevent the holes of the tracker bar which are exposed by the tapered leading end of the player roll from causing the organ to emit sound, which would, of course, be garbled, there is provided a special control switch 191, the nature of which is disclosed in FIGURE 12.

Switch 191, consisting of blades 192 and 194 is connected in bypassing relation to the volume control resistor 196 which immediately precedes the preamplifier tube 198 and controls the signal thereto. The switch is operated by a plunger 200 which is movable by pouch 202. Pouch 202 is disposed over a chamber 204 into which vacuum bleeds by way of passage 206 leading to main vacuum chamber 208 connected to the vacuum tube by conduit 210.

Chamber 204 receives air from a tube 212 leading to an end hole 214 of the tracker bar. Thus, when the paper web is positioned as shown in FIGURE 12 with hole 214 uncovered, pouch 202 will flex upwardly and this will close blades 192 and 194 and bypass the organ signal to ground. When the paper roll covers port 214, however, pouch 202 will flex downwardly and switch blades 192 and 194 will separate and the organ signal will then commence to pass through pre-amplifier 198 and on to the organ speaker. The port 214 will only be covered, of course, when the full width of the tracker bar is covered by the player roll.

A feature of the control circuit described is to be found in switch 106 which can be opened at any time to stop the playing motor MP. The opening of this switch will permit the entire system to operate except for the feeding of the paper roll so that, if desired, during study, the particular playing technique at any point along the roll can be studied and analyzed.

FIGURE 7 illustrates an advantageous manner of constructing a switch arrangement for the pedal board and for combining therewith certain other switches in the system that are under vacuum control.

In FIGURE 7 there is a relatively large chamber 300 having a main vacuum chamber 302 therein which is subjected to suction from the suction tank via connection 304. Mounted within the chamber are a plurality of normally open switches 306. Each switch 306 is under the control of a respective pouch 308 which, in turn, is under the control of a tube 310 leading to the tracker bar. Switches 306 are normally open and will close when suction is relieved beneath the respective pouches by a hole in the paper roll passing over the tracker bar hole connected to the pertaining tube 310.

Switches 306 are connected in parallel with switches 312 which are under the control of the pedals 16 of the pedal board. By this connection it is possible to control the pedal board of the organ by the paper roll without actuating the pedals themselves.

The arrangement shown in FIGURE 7 may also include other switches pertaining to the organ control circuit, such as switches S1, S2 and S3 previously referred to. There may also be located in this chamber the switch 191 that bypasses the organ volume control resistor. The unitary arrangement of the switches simplifies the manufacture and assembly of the player organ according to the present invention. Only three of the playing motor speed control switches are shown, but there could be as many included in the unit as might be desired.

With respect to the control of the volume of the organ, arrangements of the nature disclosed in FIGURES 13 and 14 have been found satisfactory.

In FIGURE 13 there is a photocell 350 which receives illumination from a light source 352. A flag 354 on swell pedal 356 is adapted for being inserted between the light source and the photocell, thereby to vary the photocell resistance and thus to control the organ volume.

For actuating the swell pedal, pneumatic motor 358 comprising the three stacked sections 360, 362 and 364 of respectively different sizes is employed. These three sections are connected to a suction manifold 366 through relays 368, 370, and 372, respectively. These relays, or valves, in turn, are controlled by the admitting of atmosphere to the tubes 374, 376, and 378, respectively, which lead to holes 380, 382, and 384, respectively, in tracker bar 34. The relays are normally open to collapse the pneumatic motor, but when atmospheric pressure is admitted to a relay via the pertaining tube, the relay closes and the pneumatic motor will expand. The holes in the tracker bar are under the control of apertures formed in the paper roll 32. A fragment of the paper roll is shown and the aperture arrangement illustrated therein shows the different degrees of organ volume that can be obtained. In the roll, to give the greatest paper strength, the apertures are spaced across the paper to align with alternate holes in the tracker bar and the aperture nearest the edge of the roll aligns with tracker bar hole #5. Thus, the apertures control tracker bar holes 5, 7, and 9, counting in from one end or the other of the tracker bar. Also, to preserve maximum paper strength, not more than two tracker bar holes are uncovered at one time.

In Section A, of the roll in FIGURE 13 none of the holes 380, 382, and 384 of the tracker bar are uncovered and the swell pedal 356 is in its maximum volume position, urged to that position by the collapsed pneumatic motors.

In Section B, only hole 380 is uncovered to trip relay 368 and admit air to the smallest pneumatic 360 whereupon swell pedal 356 will move in a direction to reduce the volume.

In Section C, only hole 382 is uncovered to trip relay 370 and admit air to the next largest pneumatic 362 whereupon pedal 356 will be adjusted still further in volume reducing direction.

In Section D, only hole 384 is uncovered to trip relay 372 and admit air to the next largest pneumatic 364 whereupon pedal 356 will be adjusted still further in volume reducing direction.

In Section E, both of holes 380 and 382 are uncovered to trip both of relays 368 and 370 to admit air to both of the pneumatics 360 and 362 whereupon pedal 356 will be adjusted still further in volume reducing direction.

In Section F, both of holes 380 and 384 are uncovered to trip both of relays 368 and 372 to admit air to both of the pneumatics 360 and 364 whereupon pedal 356 will be adjusted still further in volume reducing direction.

In Section G, both of holes 382 and 384 are uncovered to trip both of relays 370 and 372 to admit air to both of the pneumatics 362 and 364 whereupon pedal 356 will be adjusted still further in volume reducing direction.

If desired, all of the holes could be uncovered at one time to give a still further adjustment but, as mentioned, to preserve paper strength, only two holes are uncovered at any one time.

It will, thus, be seen that seven different volume settings can easily be obtained by the use of three vacuum motors of different sizes with a controlling valve or relay for each and with each valve or relay connected to a respective hole of the tracker bar and with three lines of the player roll set aside for controlling the said valves or relays.

FIGURE 14 shows a completely electrical arrangement for controlling the organ volume, also based on the employment of three switches. In FIGURE 14, the resistors 400, 402, 404, 406, 408, 410 and 412 are serially connected and are effective for controlling the passage of signals through the pre-amplifier, generally designated 414. The organ volume control resistor, actuated by the swell pedal, is indicated at 413. The connection of the resistors in the circuit is under the control of three switches 416, 418 and 420. Each switch comprises three blades and is under the control of a respective actuator which can be a pneumatically operated punch arrangement of the nature already described, or a solenoid actuator with the solenoid under the control of a pouch actuated switch.

In any case, the resistors can be successively cut into and out of the circuit in the following manner: closing of the three blades of switch 416 will establish a bypass around resistor 400 by way of wires 422 and 424 and blade 426. The other blades of switch 416 are at this time ineffective.

Closing of switch 418 while the other switches remain open will establish a bypass around resistors 400 and 402 by way of wire 428, switch blade 430 and wire 432 which leads to wire 424. At this time the other two blades of switch 418 are ineffective.

Closing of switch 420 while switches 416 and 418 remain open will bypass resistors 400, 402 and 404 by way of wire 434 and switch blade 436 and wire 438 leading to wire 432. At this time the other two blades of switch 420 are without effect.

Closing of both switches 416 and 418 will establish a bypass around resistors 400, 402, 404 and 406 by way of wire 440, blade 442 of switch 418, wire 444, blade 446 of switch 416 and wire 432.

Closing of switches 416 and 420 while switch 418 remains open will establish a bypass around resistors 400, 402, 404, 406 and 408 by way of wire 448, blade 450 of switch 420, wire 452, blade 454 of switch 416 and wire 432.

Closing of switches 418 and 420 while leaving switch 416 either open or closed will establish a bypass around resistors 400, 402, 404, 406, 408 and 410 through wire 456, blade 458 of switch 420, wire 460, blade 462 of switch 418, wire 464 and wires 438, 432 and 424.

The circuit of FIGURE 14, it will be perceived, gives seven different levels of volume by utilizing three switches and which switches can be under the control of pneumatically operated elements in the same manner as described in connection with FIGURE 13. The resistors are preferably selected to provide a logarithmic taper in value of the switch controlled resistor branch.

FIGURE 15 shows a circuit quite similar to that of FIGURE 14, but having slightly different connections between switches. The same reference numerals, where applicable, have been transferred from FIGURE 14 to FIGURE 15. In FIGURE 15, the steps of volume change are obtained by energizing the relays singly and in pairs.

Figure 16:
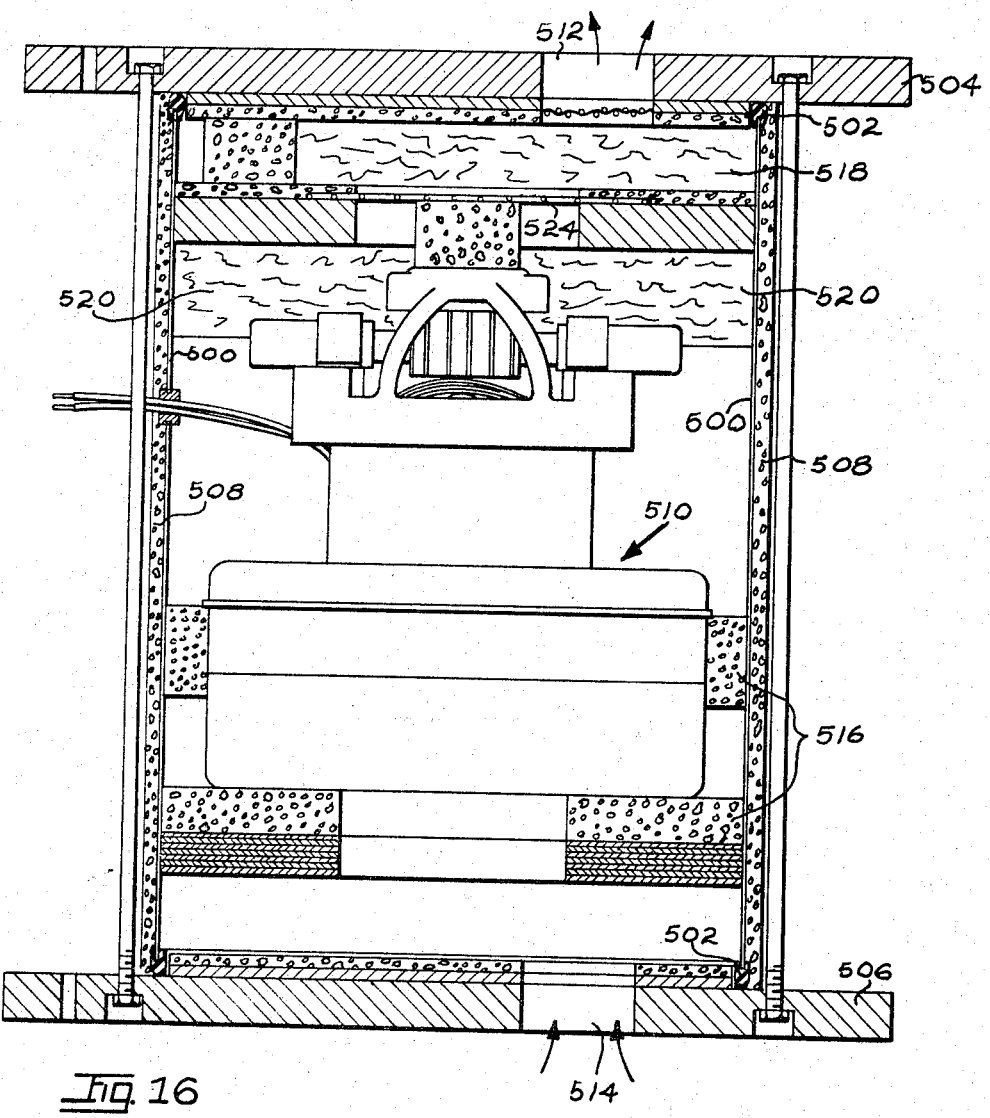
FIGURE 16 is a section through the vacuum tank showing the pump and motor therein.

FIGURE 16 shows a typical vacuum source for use with the organ. In FIGURE 16, 500 is the outer shell, sealed by strips 502 to end caps 504, 506. A shell 508 of sound absorbing sponge material covers shell 500. A motor driven pump, generally indicated at 510 is inside shell 500 and passes air between part 512 in upper cap 504 and part 514 in lower cap 506. Sponge rubber blocks 516 support the motor and pump assembly in the shell while providing sound deadening therefor.

Fiberglass muffler discs 518, 520 are disposed between the pump and part 512 to deaden sound while protective screens 522, 524 are also provided in the region of the muffler discs. The vacuum generator as shown, is extremely quiet.

FIGURES 17 and 18 show the drive arrangement employing the single motor MS. In these figures motor MS drives a fork 600 which slidably engages slotted disc 601 pinned to shaft 602. Shaft 602 extends through a plate 603 mounted as by support studs 604 on one end of the frame 28 in which the player roll is placed during a playing operation and which frame also carries tracker bar 34. Shaft 602 is reciprocable and is urged in one direction by a spring 605 and is movable in the other direction by a shifter member 606 carried by another reciprocable rod 607. A grooved plastic member 609 carried by shifter member 606 loosely surrounds shaft 602 and cooperates with one or a pair of collars 608 for shifting shaft 602.

Between frame 28 and plate 603 shaft 602 has fixed thereto a first gear 609 and a second gear 610. In the position in which the gears are illustrated gear 609 meshes with the smaller one of a pair of compound idler gears 611, the larger of which meshes with pinion 612 on a shaft 614 which is provided with means, as in the form of blade 615 for drivingly engaging one end of a perforated player roll.

The take-up roll 36 includes a shaft 616 on which is mounted a drive gear 617. Gear 617 meshes with another gear 618 positioned therebeneath which last-mentioned gear meshes with a pinion 619 fixed to a shaft to which is also fixed a somewhat larger gear 620.

In the position in which the gears are shown in FIGURE 17, shaft 614 is being driven in a direction to rewind the player roll.

To drive the player roll in playing direction shaft 602 is reciprocated from its A position to its B position or to its C position, as indicated in FIGURE 17. Movement of shaft 602 to its B position will bring gear 610 into direct meshing engagement with gear 617 and will drive shaft 616 for roll 36 at the conventional speed for the usual type of perforated player rolls. For driving rolls which are more closely perforated and which are especially designed to run at slower speeds, thereby to get more music per foot of roll, shaft 602 is shifted to its C position wherein gear 610 will mesh with gear 620 and drive gear 617 at reduced speed through gears 619 and 618.

For shifting shaft 602 from postion A to either position B or C thereof a two-position pneumatic 621 is provided which has a first section 622 and a second section 623. When only section 623 is collapsed, shifter rod 607 will be moved a distance sufficient to shift shaft 602 from its A position to its B position. When both sections 622 and 623 of pneumatic 621 are collapsed rod 607 shifts a distance sufficient to move shaft 602 from its A position to its C position. Rod 607 is biased in the right hand direction by a spring 605.

The pneumatic 621 is connected by conduit 624 with the vacuum chest so that when vacuum builds up in the vacuum chest the pneumatic will collapse as to one section thereof or as to both sections thereof and will shift the shiftable gears into one blowing position or the other.

At the end of a playing operation, when the main control relay of the playing mechanism circuit is deenergized, and vacuum decays in the vacuum chest, pneumatic 621 will relax and the shiftable gears will shift into rewind position.

Depending on whether a conventional high-speed player roll, or a low-speed player roll is to be played, switch 625 can be availed of for predetermining whether one or both sections of pneumatic 621 will collapse when a playing operation is initiated.

FIGS. 19 and 20 show more in detail the construction of the brake mechanism for braking the playing roll to a halt at the end of a rewind operation, as was explained in connection with the operation of FIG. 8a. In FIGS. 19 and 20 the opposite end of shaft 616 from that disclosed in FIG. 17 will be seen. This shaft carries the previously described spiral cam SC which may, for example, be formed of nylon. The adjacent end 626 of frame 28 also carries arm A which may advantageously be in the form of a leaf spring. FIG. 20 will show that solenoid 108a is mounted on a frame adjustably secured by screws 627 to end member 626 of frame 28. FIGS. 19 and 20 will also show that tracker bar 34 is slidably guided on the end members of frame 28 as by the nylon guide elements 628 while being held down by leaf spring member 629 which bears on the tracker bar by means of nylon rivets 630.

Tracker bar 34 may be axially shiftable so as to follow irregularities of the paper roll. This can be accomplished by providing sensing holes in the tracker bar at the side edges of the paper roll which will control a double-acting pneumatic as illustrated at 631 in FIG. 21. This double-acting pneumatic operates through a linkage system 632 to adjust the tracker bar in the direction of its length so that if the paper roll being played should for any reason drift laterally of the tracker bar, the tracker bar will follow the paper web and thus insure proper alignment of the holes therein with the corresponding holes in the paper web.

Figure 22:
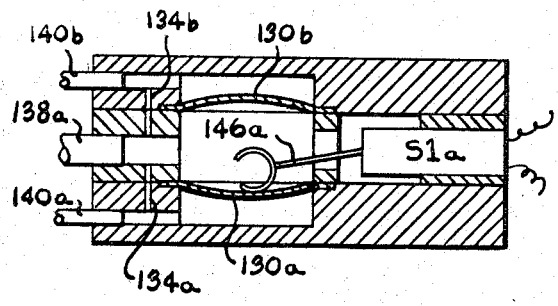
FIGURE 22 shows a modification of the switch of FIGURE 10.

FIGURE 22 shows a modification of the switch of FIGURE 10. In FIGURE 22, switch S1a is a snap action bistable switch with operating arm 146a. Two pneumatic pouches 130a and 130b are arranged on opposite sides of the end of arm 146a and are normally flexed outwardly away from the arm so that the arm rests in whichever of its two positions it occupies. Conduit 138a leads to the vacuum source while conduits 140a and 140b lead to holes of the tracker bar.

Bleed passages 134a and 134b supply suction to the outer sides of the pouches but permit the said outer sides to be subjected to atmospheric pressure when the tracker bar hole pertaining to the respective conduit 140a, 140b is uncovered by a perforation in the playing roll.

One of conduits 140a, 140b leads to the "set" hole of the tracker bar which, when uncovered, will cause adjustment of switch S1a to cause a change in speed of the playing roll drive motor. The other of the conduits leads to the "reset" hole of the tracker bar to cause resetting of the switch S1a prior to the initiation of a new playing operation. One "reset" hole could, of course, control several switches because all of the switches in the motor speed control circuit are reset at one time. Individual set holes, one for each switch, are required however so the speed control switches can be operated successively during a playing operation.

It will be understood that this invention is susceptible to modification in order to adapt it to different usages and conditions and accordingly, it is desired to comprehend such modifications within this invention as may fall within the scope of the appended claims.

What is claimed is:

1. A player type organ having playing keys, a pneumatic key controlling system including a tracker bar over which a perforated player roll passes and also including key actuating pneumatic motors beneath the respective keys to be actuated thereby, and means connecting the motors with the respective keys for actuation of the keys by the motors while permitting operation of the keys independently of the motors, said means comprising a flexible inextensible element for each key connected at one end to the respective key and at the other end to the motor for the said key.

2. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; adjustable swell pedal means for the organ, multi-position pneumatic motor means connected to said swell pedal means for moving the swell pedal into a plurality of positions, and means leading from said motor means to the tracker bar for control of the motor means by perforations in said player roll.

3. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; adjustable swell pedal means for the organ, a plurality of stacked pneumatic motors connected to said swell pedal for moving the swell pedal into a plurality of positions, a valve for controlling each motor, and means leading from each valve to the tracker bar for control of the valves by perforations in said player roll.

4. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; adjustable swell pedal means for the organ, a plurality of stacked pneumatic motors connected to said swell pedal for moving the swell pedal into a plurality of positions, a valve for controlling each motor, and means for operating said valves singly or jointly and including means leading to the tracker bar and under the control of perforations in said player roll.

5. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; said organ including electrically operated amplifier means, a plurality of serially connected resistors connected to the amplifier means to control the signal therefrom, a plurality of switches connected to the junction points of said resistors operable for short circuiting said resistors, and pneumatic means under the control of said player roll for controlling said switches.

6. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; said organ including electrically operable amplifier means, a plurality of serially connected resistors connected to the amplifier means to control the signal therefrom, a plurality of switches connected to the junction points of said resistors operable for establishing by-passes from one end of the serially connected resistors to the respective junction points, and pneumatic means under the control of said player roll for controlling said switches.

7. A player type organ having playing keys, a pneumatic key controlling system including a tracker bar over which a perforated player roll passes and also including key actuating pneumatic motors beneath the respective keys to be actuated thereby, means connecting the motors with the respective keys for actuation of the keys by the motors while permitting operation of the keys independently of the motors, said organ comprising a pedal keyboard, first switches operated by the pedals of said pedal keyboard, second switches connected in parallel with said first switches, and pneumatic means under the control of said player roll for controlling said second switches.

8. A player type organ having playing keys, a pneumatic key controlling system including a tracker bar over which a perforated player roll passes and also including key actuating pneumatic motors beneath the respective keys to be actuated thereby, means connecting the motors with the respective keys for actuation of the keys by the motors while permitting operation of the keys independently of the motors, said organ comprising a pedal keyboard, first switches operated by the pedals of said pedal keyboard, second switches connected in parallel with said first switches, pneumatic means under the control of said player roll for controlling said second switches, said organ also including variable volume adjusting means, and second pneumatic means also under the control of said player roll for controlling said volume adjusting means.

9. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; said organ including a take up roll and a playing motor connected thereto, said player roll having a tapered lead end which is connected to said take up roll, means for energizing said source of vacuum to initiate a playing operation when a player roll has its leading end connected to said take up roll, means responsive to the development of a predetermined degree of vacuum in said source for energizing said playing motor to initiate movement of said player roll over said tracker bar, control means normally preventing said organ from developing sound, and means operated by said player roll when the tapered lead end thereof has passed beyond said tracker bar for making said control means ineffective.

10. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; said organ including a take up rll and a playing motor connected thereto, said player roll having a tapered lead end which is connected to said take up roll, means for energizing said source of vacuum to initiate a playing operation when a player roll has its leading end connected to said take up roll, means responsive to the development of a predetermined degree of vacuum in said source for energizing said playing motor to initiate movement of said player roll over said tracker bar, switch means operable when closed to prevent the organ from developing sound, a pneumatic operator for said switch means having first means responsive to vacuum in said source for holding said switch means closed, said operator having second means responsive to vacuum in said source for making said first means ineffective, and means comprising a hole in the tracker bar which is covered only when the full width of the player roll is on the tracker bar for admitting air to said second means until the said hole is covered.

11. In a player type organ: an organ case, said organ including keyboard means, pneumatic means for controlling the keyboard means and including a player mechanism comprising a frame, means for supporting a perforated paper player roll in said frame, a tracker bar in the frame over which the roll is to be drawn and having holes controlled by the perforations in the roll, a take-up reel in the frame on which the paper roll is wound up during playing, an upwardly opening compartment in the organ case recessed into the top thereof, and said playing mechanism being located in said compartment.

12. In a player type organ: an organ case, said organ including keyboard means, pneumatic means for controlling the keyboard means and including a player mechanism comprising a frame, means for supporting a perforated paper player roll in said frame, a tracker bar in the frame over which the roll is to be drawn and having holes controlled by the perforations in the roll, a take-up reel in the frame on which the paper roll is wound up during playing, an upwardly opening compartment in the organ case recessed into the top thereof, and said playing mechanism being located in said compartment, said compartment comprising lid means forming a part of the top wall of the organ case, said organ case including a music rack upstanding near the front end of said top wall, said music rack being connected with said lid means and being movable backwardly on the top wall with the opening of said lid means to expose said compartment.

13. A playing device for a perforated roll operated musical instrument comprising; a frame, first means in the frame for receiving a wound-up player roll, second means in the frame adapted for connection to the end of the player roll and operable to reel up the roll during a playing operation, a tracker bar over which the roll is drawn during playing having holes controlled by the perforations in the roll, a drive motor for said first and second means, means normally engaging said drive means with said first means, a vacuum chest, a pneumatic motor operable when subjected to suction to connect said motor with said second means, means for developing suction in said vacuum chest to initiate a playing operation, and means operable at the end of a playing operation and under the control of a hole in said tracker bar and an aperture in said playing roll for interrupting the suction in said vacuum chest whereby the said motor will again become connected with said first means and effect rewinding of said player roll.

14. A perforated roll control arrangement for a musical instrument wherein a perforated web is drawn over a tracker bar having apertures controlled by the perforations of the web; means for supporting a perforated player roll having a leading end, a take-up roll having means to engage said leading end and drivable to draw the web over the tracker bar, motor means to drive said take-up roll during a playing operation and to drive said means supporting said player roll during a rewinding operation, a stop element connected to said take-up roll, a stop member normally disposed out of the path of said stop element and movable into the path of said stop element, control means operable during a rewind operation to move said stop member into the path of said stop element before the leading end of said roll becomes detached from said take-up roll, and means operable thereafter for moving said stop member out of the path of said stop element and for again driving said take-up roll for a repeat playing operation.

15. A perforated roll control arrangement for a musical instrument wherein a perforated web is drawn over a tracker bar having apertures controlled by the perforations of the web; means for supporting a perforated player roll having a leading end, a take-up roll having means to engage said leading end and drivable to draw the web over the tracker bar, motor means to drive said take-up roll during a playing operation and to drive said means supporting said player roll during a rewinding operation, a stop element connected to said take-up roll, a stop member normally disposed out of the path of said stop element and movable into the path of said element, control means operable during a rewind operation to move said stop member into the path of said stop element before the leading end of said roll becomes detached from said take-up roll, said control means also simultaneously deenergizing said motor means, and means operable thereafter for moving said stop member out of the path of said stop element and for again energizing said motor means.

16. A playing device for a perforated roll operated musical instrument comprising; a frame, first means in the frame for detachably receiving and drivingly engaging a wound-up web-like player roll having a tapered leading end, a take-up roll in the frame having means for detachable engagement with the leading end of said player roll, an electric drive motor, shiftable gear means having a first position to connect the drive motor with said take-up roll for a playing operation and a second position to connect the drive motor with said first means for a rewind operation, means operable following a playing operation to shift said gear means into said second position, means selectively adjustable for halting said take-up roll during a rewind operation before the said leading end of the roll is detached therefrom and for deenergizing said motor, and means automatically operable thereafter for shifting said gear means into said first position and for again energizing said motor to cause repeat playing of a player roll.

17. In a perforated roll controlled player electronic organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; volume adjusting resistor means in the sound producing system of the organ, and means under the control of said player roll for varying said resistor means.

18. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; means for supporting a player roll on one side of the tracker bar, a take-up roll on the other side of the tracker bar, an electric drive motor to drive said take-up roll, an electrical energizing circuit for said drive motor including a plurality of resistors in series, switches connected in bypassing relation to at least some of said resistors, means for closing said switches prior to initiation of movement of said player roll over the tracker bar and to said take-up roll, and means operated by the player roll at spaced points along the length thereof for successively opening said switches whereby the speed of said drive motor can be adjusted during the winding up of a player roll on said take-up roll to keep the linear speed of the player roll substantially constant.

19. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; means for supporting a player roll on one side of the tracker bar, a take-up roll on the other side of the tracker bar, an electric drive motor to drive said take-up roll, an electrical energizing circuit for said drive motor including a plurality of resistors in series, snap action switches connected in bypassing relation to at least some of said resistors, spring means normally holding said switches closed, means operable upon the development of vacuum in said source of vacuum for making said spring means ineffective, a normally ineffective vacuum operated means for each switch responsive to a supply of air thereto for moving the respective switch to open position, and means operated by said player roll at spaced points therealong for causing a supply of air to said vacuum operated means in succession, whereby the speed of said drive motor can be adjusted during the winding up of a player roll on said take-up roll to keep the linear speed of the player roll substantially constant.

20. In a perforated roll controlled player organ having playing keys, pneumatic actuating motors operatively connected to the respective keys, a pneumatic system including a source of vacuum connected to the motors and including control valves for the motors and a tracker bar connected to said valves for effecting control thereof in conformity with the perforation pattern of a player roll moved over the tracker bar; means for supporting a player roll on one side of the tracker bar, a take-up roll on the other side of the tracker bar, an electric drive motor to drive said take-up roll, an electrical energizing circuit for said drive motor including a plurality of resistors in series, snap action switches connected in bypassing relation to at least some of said resistors, spring means normally holding said switches closed, means operable upon the development of vacuum in said source of vacuum for making said spring means ineffective, a pouch operatively connected to each switch and normally subjected to vacuum from said source of vacuum on both sides and operable upon relieving the vacuum on one side to move the respective switch into its open position, tube means leading to the tracker bar from one side of each pouch, and holes spaced along the length of said player roll for successively admitting air to said tubes for progressively opening said switches as the player roll builds up on said take-up roll, whereby the speed of said drive motor can be adjusted during the winding up of a player roll on said take-up roll to keep the linear speed of the player roll substantially constant.

21. In a player type organ: an organ case, said organ including keyboard means, pneumatic means for controlling the keyboard means and including a player mechanism comprising a frame, means for supporting a perforated paper player roll in said frame, a tracker bar in the frame over which the roll is to be drawn and having holes controlled by the perforations in the roll, a take-up reel in the frame on which the paper roll is wound up during playing, an upwardly opening compartment in the organ case recessed into the top thereof, and said playing device being located in a said compartment, said compartment comprising lid means forming a part of the top wall of the organ case, said organ case including a music rack upstanding near the front end of said top wall, said music rack being connected to the front edge of said lid means, said lid means being hinged at its back edge to the top wall of the organ case, said lid means being formed of parts hinged together and said parts buckling upwardly behind the music rack when the compartment is exposed, said music rack moving backwardly as the lid opens.

22. In a player mechanism for a player roll operated musical instrument; a frame, means in the frame for receiving a perforated playing roll, a tracker bar over which the roll is drawn as it is unwound and which has holes controlled by the perforations of the player roll, a take-up reel in the frame to which the end of the player roll is attached and which is driven during playing to draw the paper roll across the said tracker bar, asid player roll being driven during rewinding to wind up the player roll at the end of a playing operation, a drive motor for said player roll and said take-up reel, a geared transmission carried by said frame and including a first gear attached to said take-up reel for driving the same during a playing operation, and a second gear attached to said playing roll for driving the same during a rewind operation, a drive motor, shiftable gear means drivingly connected to said motor and located in said transmission, said shiftable gear means having a first position of operative engagement with said first gear and a second position of operative engagement with said second gear, a speed reducing driving train leading from said first gear and terminating in a third gear, said shiftable gear means having a third position of operative engagement with said third gear whereby a single drive motor provides for driving said player roll during rewinding and driving of said take-up reel at either of two predetermined speeds during a playing operation, a three-position pneumatic motor operatively connected to said shiftable gear means for effecting the shifting thereof, and adjustable control valve means connected with said pneumatic motor for determining the amount of movement thereof.

References Cited

UNITED STATES PATENTS

| 2,943,525 | 7/1960 | Sauerland | 84—25 |
| 1,066,590 | 7/1913 | Dreher | 84—131 |
| 1,400,239 | 12/1921 | Russell | 84—84 |
| 1,405,932 | 2/1922 | Meier | 84—84 |

FOREIGN PATENTS 673,099   1/1930   France.

ARTHUR GAUSS, *Primary Examiner.*

DONALD D. FORRER, *Assistant Examiner.*

U.S. Cl. X.R.

84—1.09, 1.27, 25, 84, 88, 131